United States Patent [19]

Thein et al.

[11] Patent Number: 5,108,532
[45] Date of Patent: Apr. 28, 1992

[54] METHOD AND APPARATUS FOR SHAPING, FORMING, CONSOLIDATING AND CO-CONSOLIDATING THERMOPLASTIC OR THERMOSETTING COMPOSITE PRODUCTS

[75] Inventors: Joe K. Thein, Torrance; Mauricio A. Mejia, Los Angeles, both of Calif.

[73] Assignee: Northrop Corporation, Los Angeles, Calif.

[21] Appl. No.: 392,628

[22] Filed: Aug. 11, 1989

Related U.S. Application Data

[63] Continuation-in-part of Ser. No. 151,366, Feb. 2, 1988, abandoned.

[51] Int. Cl.⁵ .............................................. B32B 31/20
[52] U.S. Cl. ................................. 156/285; 156/308.2; 156/382; 156/583.3; 264/511; 425/388; 425/390
[58] Field of Search ............... 156/285, 286, 309.9, 156/308.2, 381, 382, 497, 583.3; 264/510, 511; 425/388, 389, 390

[56] References Cited

U.S. PATENT DOCUMENTS

| | | | |
|---|---|---|---|
| 2,931,064 | 4/1960 | Matoba | 425/388 |
| 3,964,958 | 6/1976 | Johnston | 156/285 X |
| 4,116,736 | 9/1978 | Sanson et al. | 425/388 X |
| 4,180,426 | 12/1979 | Oustin et al. | 156/286 X |
| 4,504,341 | 3/1985 | Radzwill et al. | 156/285 X |
| 4,714,424 | 12/1987 | Kinugasa et al. | 425/388 |
| 4,754,009 | 6/1988 | Squire | 526/247 |

Primary Examiner—Michael W. Ball
Assistant Examiner—Michele K. Yoder
Attorney, Agent, or Firm—Terry J. Anderson; Robert B. Block

[57] ABSTRACT

A method of shaping, forming, consolidating and co-consolidating a workpiece of layers of thermoplastic or thermosetting composite material into a final composite product. The associated apparatus includes upper and lower sheets of Kapton, Upilex or equivalent film which are positioned between upper and lower supports, respectively, in facing relationship and adapted to receive therebetween a workpiece to be shaped and formed. Means are provided for applying high heat to opposite sides of the supports, the sheets and the workpiece. Means are also provided for applying high pressure to the upper sheet, a diaphragm, and one side of the workpiece and for applying vacuum pressure to the other sheet and the other side of the workpiece for shaping and forming the workpiece into the final composite product.

2 Claims, 3 Drawing Sheets

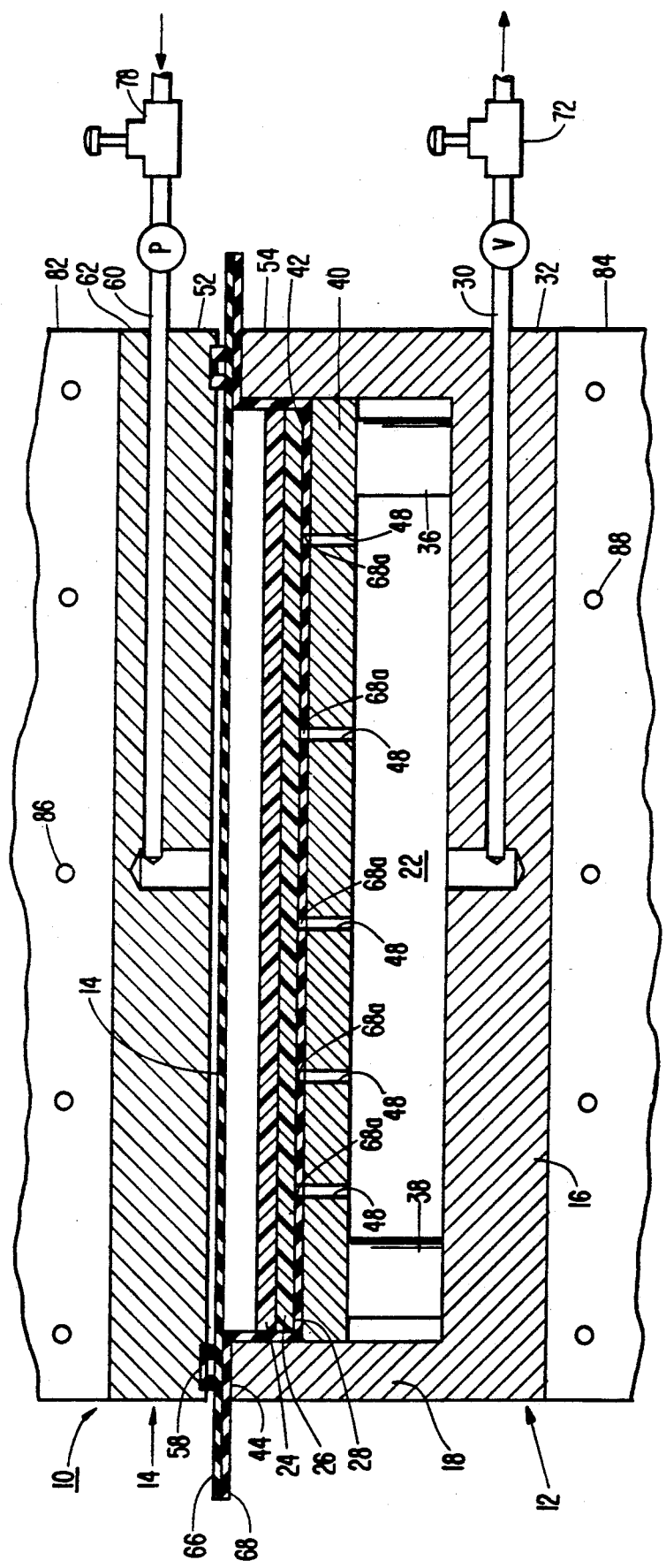
FIG. I.

METHOD AND APPARATUS FOR SHAPING, FORMING, CONSOLIDATING AND CO-CONSOLIDATING THERMOPLASTIC OR THERMOSETTING COMPOSITE PRODUCTS

CROSS-REFERENCE TO RELATED APPLICATION

This application is a continuation-in-part application of our prior co-pending application entitled Method and Apparatus for Shaping, Forming, Consolidating and Co-consolidating Thermoplastic or Thermosetting Composite Products, filed Feb. 2, 1988, Ser. No. 07/151,366, now abandoned.

TECHNICAL FIELD OF THE INVENTION

This invention relates to apparatus for shaping and forming a thermoplastic or thermosetting composite product and, more particularly, to tooling for a hot platen press employing a polyimide diaphragm such as a Kapton, Upilex or equivalent film for applying heat and pressure to layers of thermoplastic or thermosetting materials for its shaping, forming, consolidating and co-consolidating. Also disclosed is the method for shaping, forming, consolidating and co-consolidating layers of thermoplastic material into a final composite product through heat and pressure as applied through a polyimide diaphragm such as Kapton, Upilex or equivalent film.

DESCRIPTION OF THE BACKGROUND ART

The bonding, shaping, forming, consolidating or co-consolidating of layers of thermoplastic material, a workpiece, into various composite products is generally effected through the concurrent application of heat and pressure. Known devices to apply such heat and pressure may take the form of upper and lower platens for receiving the workpiece therebetween. The platens are provided with mechanisms to apply pressure to opposite sides of the workpiece and with electrical resistance elements to concurrently apply heat to the workpiece.

Various approaches are disclosed in the literature to improve the efficiency of heated platen presses. By way of example, note U.S. Pat. No. 3,964,958 to Johnson. According to that disclosure, at least one surface having a diaphragm is positioned adjacent to a mating support surface. The diaphragm and support surface are located in opposed relationship with respect to each other. Layers of material to be adhesively bonded therebetween are positioned in a pressure chamber between the diaphragm and the mating surface. The process indicates bonding of two materials with adhesive film. The pressure in the chamber is raised above the ambient pressure to thereby cause a deflection of the diaphragm. Either the support surface or the pressure chamber, or both, is moved towards the other causing contact between the deflected diaphragm and the support surface with the layers of material therebetween. As the relative movement continues and the pressure increases, heat is applied by electrical resistance elements. The material will thus be bonded and shaped into the final composite product by the effects of the heat and the pressure.

In U.S. Pat. No. 3,964,958 to Johnson, the use of Kapton is disclosed as a diaphragm material while U.S. Pat. No. 4,273,604 to Johnson discloses Kapton in the layer of a diaphragm, such diaphragm comprising a Kapton layer, bonding layers, middle layers and encapsulating layers.

Although many such advances are noteworthy to one extent or another, none achieves the objectives of an efficient, reliable, inexpensive, convenient to use hot platen presses designed for the efficient application of high thermal energy and pressure applied through a diaphragm.

As illustrated by the great number of prior patents and commercial devices, efforts are continuously being made in an attempt to improve hot platen presses and tooling to render them more efficient, reliable, inexpensive and convenient to use. None of these previous efforts, however, provides the benefits attendant with the present invention. Additionally, hot platen presses and tooling of the prior art do not suggest the present inventive combination of component elements arranged and configured as disclosed and claimed herein. The present invention achieves its intended purposes, objects and advantages over the prior art devices through a new, useful and unobvious combination of method steps and component elements, with the use of a minimum number of functioning parts, at a reasonable cost to manufacture, and by employing only readily available materials.

It is a general object of this invention to shape and form layers of thermoplastic or thermosetting materials with an improved polyimide diaphragm capable of sustaining high temperatures.

It is a further general object of the invention to shape and form improved composite products by consolidating and co-consolidating layers of thermoplastic or thermosetting material, through the application of high temperatures, using a stretchable diaphragm of Kapton, Upilex or equivalent film.

It is a specific object of this invention to provide an improved apparatus for shaping, forming, consolidating or co-consolidating a workpiece formed of layers of thermoplastic or thermosetting composite material into a final composite product including upper and lower supports; an upper polyimide sheet beneath the upper support and adapted to receive the workpiece thereberneath; means for applying high heat to opposite sides of the supports, the sheet and the workpiece; and means for applying high pressure to the upper face of the sheet and one side of the workpiece and for applying vacuum pressure to the other side of the workpiece for shaping and forming the workpiece into the final composite product.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. For the purpose of summarizing the invention, the present invention may be incorporated into apparatus for shaping, forming, consolidating and co-consolidating a workpiece formed of layers of thermoplastic or thermosetting composite material into a final composite product. The apparatus includes upper and lower supports; an upper polyimide sheet beneath the upper support and adapted to receive the workpiece therebeneath; means for applying high heat to opposite sides of the supports, the sheet and the workpiece; and means for applying high pressure to the upper face of the sheet and one side of the workpiece and for applying vacuum pressure to the other side of the workpiece for shaping and forming the workpiece into the final composite product. The polyimide sheet is from the class of materials including Kapton, Upilex and equivalent films. The high temperature is in excess of 800 degrees Fahrenheit. The sheet is a diaphragm and the workpiece is located on a tool.

The invention may be incorporated into apparatus for shaping forming, consolidating and co-consolidating a workpiece formed of layers of thermoplastic or thermosetting material into a final composite product. The apparatus includes upper and lower supports; an upper diaphragm and a lower sheet of polyimide film located between the upper and lower supports, respectively, in facing relationship and adapted to receive therebetween on a support plate the workpiece to be bonded and shaped; means for applying heat in excess of 800 degrees Fahrenheit to opposite sides of the supports, the diaphragm and sheet and the workpiece; and means for applying high pressure to the diaphragm and one side of the workpiece and for applying vacuum pressure to the sheet and the other side of the workpiece for shaping and forming the workpiece into the final composite product. The sheet is located on a tool.

This invention includes a method of shaping, forming, consolidating and co-consolidating a workpiece formed of layers of composite material into a composite final product including the steps of providing upper and lower supports; providing upper and lower sheets of polyimide film between the upper and lower supports, respectively in facing relationship and adapted to receive therebetween the workpiece to be bonded and shaped; supporting the sheets and workpiece on a tool; applying heat in excess of 800 degrees Fahrenheit to opposite sides of the supports, the sheets and the workpiece; applying high pressure to one sheet and one side of the workpiece; and applying vacuum pressure to the other sheet and the other side of the workpiece for shaping and forming the workpiece into the final composite product.

A further object is to provide a process of the above character for forming and shaping of unconsolidated laminates and consolidated sheets of high temperature thermoplastic composite material into a final consolidated process define complex or shape.

Polyimide films (such as those trade names as Kapton (DuPont), Upilex (ICI), etc. are capable of plastic deformation at high temperature (i.e. it can be stretched to greater than about 30%). Upilex-R is preferred in this respect.

High temperature thermoplastic composites have $T_g$ (glass transition temperatures) and start softening at about 580° F. and above depending on type of thermoplastic. The $T_g$ for most of the thermoplastic materials currently available are approximately between 500° F. to 580° F.

Utilizing plastic formability of polyimide film (stretchability of film) and temperatures above the $T_g$ of thermoplastic composite, the polyimide film stretches across over the softened thermoplastic layers and conforms to and consolidates to the mold shape assisted by positive pressure (i.e. air or inert gas pressure) on the upper side of the diaphragm and negative pressure (i.e. vacuum) on the other side of this diaphragm.

Thus, the process of the present invention uses both gas pressure and vacuum during consolidation and co-consolidation Vacuum is used:

1) to prevent resistance in forming and to remove pressure due to any chemically reacted gas/air built up below the diaphragm.

2) To remove air between laminates for compaction during processing.

3) To assist removal of air between (corners of tooling) thermoplastic laminates and tooling during process.

4) To assist forming into constricted corner of tooling.

The foregoing has outlined rather broadly the more pertinent and important features of the present invention in order that the detailed description of the invention that follows may be better understood so that the present contribution to the art may be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures and methods for carrying out the same purposes of the present invention. It should also be realized by those skilled in the art that such equivalent constructions and methods do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which:

FIG. 1 is a sectional view of a hot platen press for shaping, forming, consolidating and co-consolidating layers of thermoplastic or thermosetting composite material into a final composite product in accordance with the principle of the present invention.

Similar numerals refer to similar parts in the two embodiments.

DETAILED DESCRIPTION OF THE INVENTION

Figure 1A:
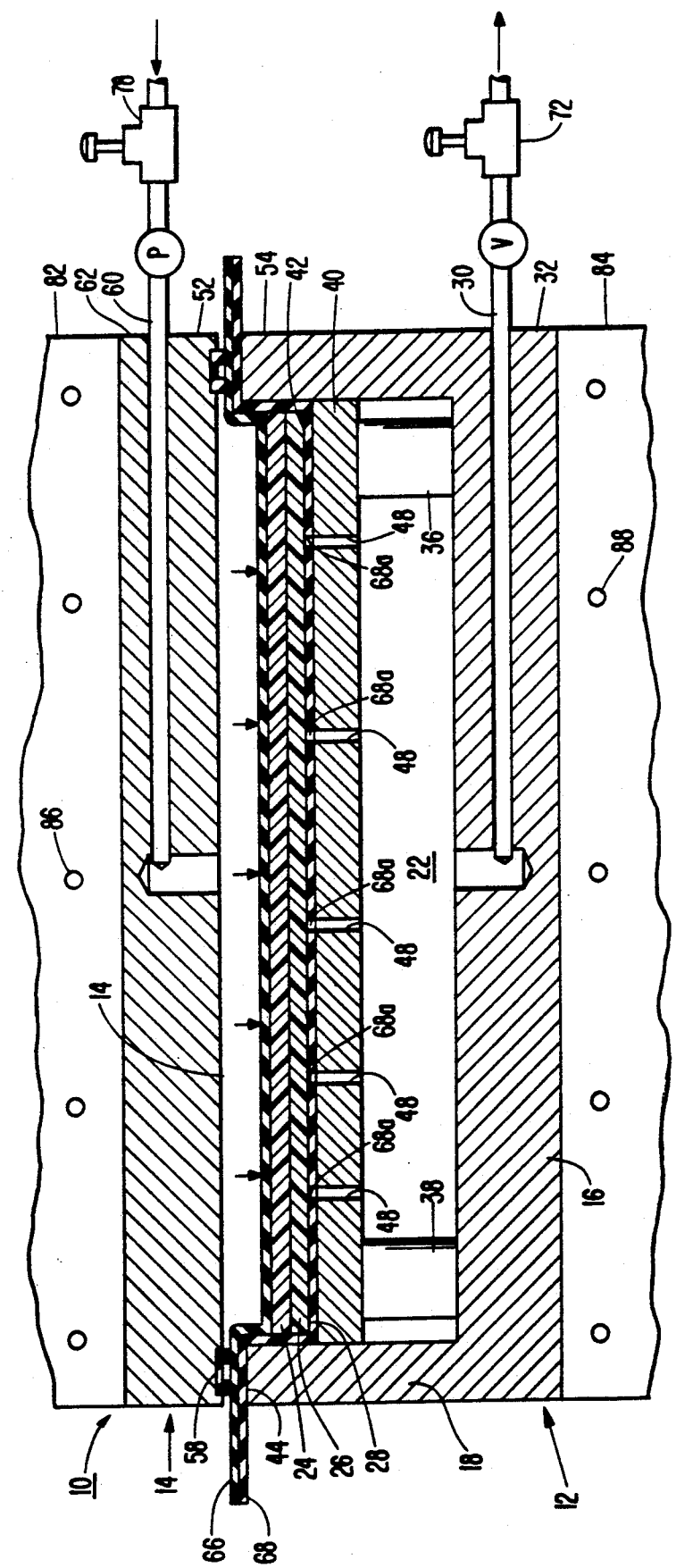
FIG. 1A is a cross-sectional view similar to that shown in FIG. 1 showing the same after the formation process is completed within the press and shows stretching deformation of the Kapton sheet into shaping, forceable contact with the consolidated, shaped plastic part within the press.

Shown in FIG. 1 is a cross-sectional view of tooling 10 for a hot platen press capable of fabricating the composite thermoplastic or thermosetting composite products in accordance with the principles of the present invention. The tooling 10 includes a lower assembly 12 and an upper assembly 14. The lower assembly 12 has at its lower-most end a generally rectangular lower base plate 16 with upstanding walls 18 forming a vacuum box or chamber 22 therein. The chamber 22 is adapted to receive the layers 24 and 26 of thermoplastic or thermosetting composite material, the workpiece 28, which are to be shaped, formed, consolidated and co-consolidated into the final composite product. A vacuum line 30 extends from one edge 32 of the base plate 16 into a central portion of the chamber 22 at its bottom. Also located within the chamber 22 are upstanding riser blocks 36 and 38 and a support plate or tool 40 positioned with its upper surface 42 just beneath the upper edges 44 of the upstanding walls 18 of the lower assembly 12. The support plate 40 is provided with apertures 48 constituting vacuum outlet holes for the removal of trapped air pockets and whereby the reduced pressure in the chamber 22 of the vacuum 23 may extend to a supported workpiece 28 thereabove through small holes or perforations 68a included in the lower polyimide sheet 68 which holes align with the aperatures 48.

The upper assembly 14 or cover has a periphery 52 substantially coextensive with periphery 54 of the upstanding walls 18 of the chamber 22. A pressure seal 58 formed of an elastomeric material is positionable therebetween to seal the space between the upper 14 and lower 12 assemblies. The pressure seal 58 may be of any conventional cross-sectional configuration as shown, or it may be an O-ring or the like. An air inlet line 60 extends from one side edge 62 of the upper assembly 14 and terminates at a central position thereof.

Positionable between the upper assembly 14 and the support plate or tool 40, is the workpiece 28. The workpiece 28 includes a plurality of layers 24 and 26 or plies of thermoplastic or thermosetting composite material adapted to form the layers of the composite product when consolidated and co-consolidated. Layers such as AMD-2 laminate or AS4/PEEK are typical but preferred materials for such layers. AMD-2 is Torlon, a trade name of a thermoplastic matrix material made by Amoco Chemical Company of Chicago, Ill. AS4/PEEK is a carbon fiber material impregnated with polyetheretherketone available from ICI Chemicals of Wilmington, Del.

The dimensions of the support structure, plate 40, and the workpiece 28 so that there is headroom between the upper film or sheet 66 and the workpiece before vacuum is applied. After heating, sheet 66 deforms and stretches under the high temperature and pressure into smoothing expanding contact with the workpiece to produce a workpiece of high quality smooth surface finish.

The forming process of the present invention utilizes heat and pressure on a workpiece 28 positioned between sheets 66 and 68 of polyimide, preferably Kapton, Upilex or equivalent film. Kapton is a trademark of E. I. DuPont, de Nemours, a corporation of Delaware. Upilex is a trade name of a polyimide film manufactured by UBE Industries Ltd. of Tokyo, Japan and distributed by ICI (America) Corporation. The upper sheet 66 is a diaphragm while the lower sheet, which may be eliminated, or limited to cover plate 40 only, merely functions to create a smoother surface on the adjacent surface of the workpiece since the tool is normally more irregular in surface characteristics than the lower sheet 68. The sheets 66 and 68 are held in position by the mating of the upper 14 and lower 12 assemblies with securement effected by the pressure applied by the pressure seal 58. Alternately, sheet 68 may extend only over the floor of the mold in which case only sheet 66 is engaged by the seal. The sheets 66 and 68 are readily removable and are replaced as required after each cure.

Beneath the workpiece and lower sheet 68 the space is adapted to be of reduced pressure through a vacuum being drawn through a line 30. A valve 72 and source, not shown, of reduced pressure air effect the vacuum. Above the workpiece 28 and upper diaphragm 66, the space 74 is adapted to be of an increased pressure through a flow of high pressure air delivered through a line 60. A valve 78 and source, not shown, of increased pressure air effect the high pressure. The pressure differential between the space 74 and 22 above and below the workpiece 28 and sheets 66 and 68, together with the applied heat, effect the bonding and shaping, forming, consolidating and co-consolidating of the workpiece layers 24 and 26.

Pressure platens 82 and 84 and heater elements 86 and 88 are also preferably positioned on opposite sides of the upper 14 and lower 12 assemblies. Pressure and heat may be applied through the hot platen press of the type well known in the prior art.

In operation and use, with the thermoplastic layers 24 and 26 positioned between the upper 14 and lower 12 assemblies, and with sheets 66 and 68 in contact with the upper and lower faces of the thermoplastic or thermosetting composite layers 24 and 26; and with the heater elements energized and with the upper air inlet line 60 exerting pressure, and with the lower vacuum line 30 drawing a vacuum, the heat and pressure forces will exert heat and pressure on the workpiece 28 to shape, form, consolidate and co-consolidate its layers and thereby create the final product as intended.

In the prior art practices the workpiece layers would be laid up and heated to just above the consolidation temperature of the thermoplastic material of the layers. A supporting tooling device would also be heated to a temperature that conventional diaphragms could withstand, a temperature below the consolidation temperature of the workpiece. The laid up workpiece would then be quickly transferred to the tooling device, held in place by vacuum, and the diaphragm pushed downward with air pressure to bond and shape the workpiece into the final product. The primary problem was effecting the quick transfer of the heated laid up workpiece to the tooling device. This step was necessary because there was then no known diaphragm material which could withstand the forming temperature in excess of 725 degrees Fahrenheit needed for candidate thermoplastic matrix composites intended to be formed into the final superior product.

Heat exposure tests were run on known rubber compounds to determine whether they could be used as a diaphragm material. From a careered cured sheet provided by a manufacturer, several specimens of known materials, rubbers, were cut. These specimens were held in an oven for one hour at 680, 700, and 750 degrees Fahrenheit, respectively. The specimen exposed to 750 degrees Fahrenheit showed surface cracks and signs of oxidation. No change in appearance was observed in the other specimens. These results indicated that known rubber compounds could withstand temperatures up to 700 degrees Fahrenheit without load but not above 700 degrees Fahrenheit.

These materials were subsequently used as the diaphragms for forming a thermoplastic matrix composite laminate, specifically, AS4/PEEK. To avoid the temperature loss in transferring the heated laminate to the tooling, the entire tooling assembly containing the laminate was heated to 700 degrees Fahrenheit, which is below the lower end of the preferred laminate forming temperature range of the present invention.

The assembly was placed between the platens of a press which were heated. No vacuum or pressure was applied initially. When the laminate reached 650 degrees Fahrenheit, a 10 inch mercury vacuum pressure was applied to the lower chamber of the tooling device. The vacuum pressure was gradually increased with rising temperature, until a full vacuum of thirty (30) inches of mercury was reached at 700 degrees Fahrenheit. Then, the press was closed at one hundred (100) pounds per square inch to seal the tooling device to allow positive air pressure to be applied to the upper chamber. Before the air pressure could be applied, the rubber disintegrated under the closing pressure of the press platens. Consequently, the rubber and the laminate did not form to the desired contour.

As an alternate to the then known high temperature rubber, a polyimide, Kapton film, was evaluated as a diaphragm material for forming composite thermoplastic laminates. According to manufacturer specification, Kapton film reaches ninety percent (90%) of its maximum elongation at 570 degrees Fahrenheit.

A 5 mil-thick Kapton film was tested by stretching it over a 0.75 inch by 4 inch by 4 inch picture frame chamber applying full vacuum under the film and 100 psi shop air pressure at 660, 725, 760 and also 815 degrees Fahrenheit, respectively. The results were very promising. Average elongations in the stretched areas for the three forming temperatures were as follows: 8.7% elongation at 660 degrees Fahrenheit; 14.1% elongation at 725 degrees Fahrenheit; and 19.6% elongation at 760° degrees Fahrenheit.

The Kapton film was then tested as a diaphragm for forming four ply AS4/PEEK thermoplastic matrix composite laminates, 4 inch by 4 inch in planform. Laminates were formed to various contours. The Kapton film stretched well and maintained integrity under the forming conditions at full vacuum and 100 psi shop air pressure for all contours formed. The appearance of the formed laminates was excellent, better than when formed by matched mold press cure. The per-ply thicknesses of the formed parts were 8 mil and 6 mil.

Further testing was performed using the 5 mil thick Kapton film as a diaphragm in another tooling. This tooling was fabricated for forming a ten ply AS4-/PEEK laminate into a panel with a 30 inch radius and an approximate 1 inch bead height, thickness was measured to be 4 mil average.

The same forming experiment was performed on a 4-ply AMD-2 composite laminate. The formed panel, has a good appearance. The per-ply thickness was approximately 9 mil as compared to 13 to 17 mil before consolidation.

FIG. 1 shows the general arrangement before application of pressure and vacuum while FIG. 1A shows the stretch of the upper Kapton sheet 66 into contact with the laminate which takes place during the process of this invention. The ability to stretch into intimate contact with the laminate has the effect of fully pressing the laminate into conformity with the tool shape and also of smoothing the laminate upper surface on the side away from the tool into a very well formed surface.

Figure 2:
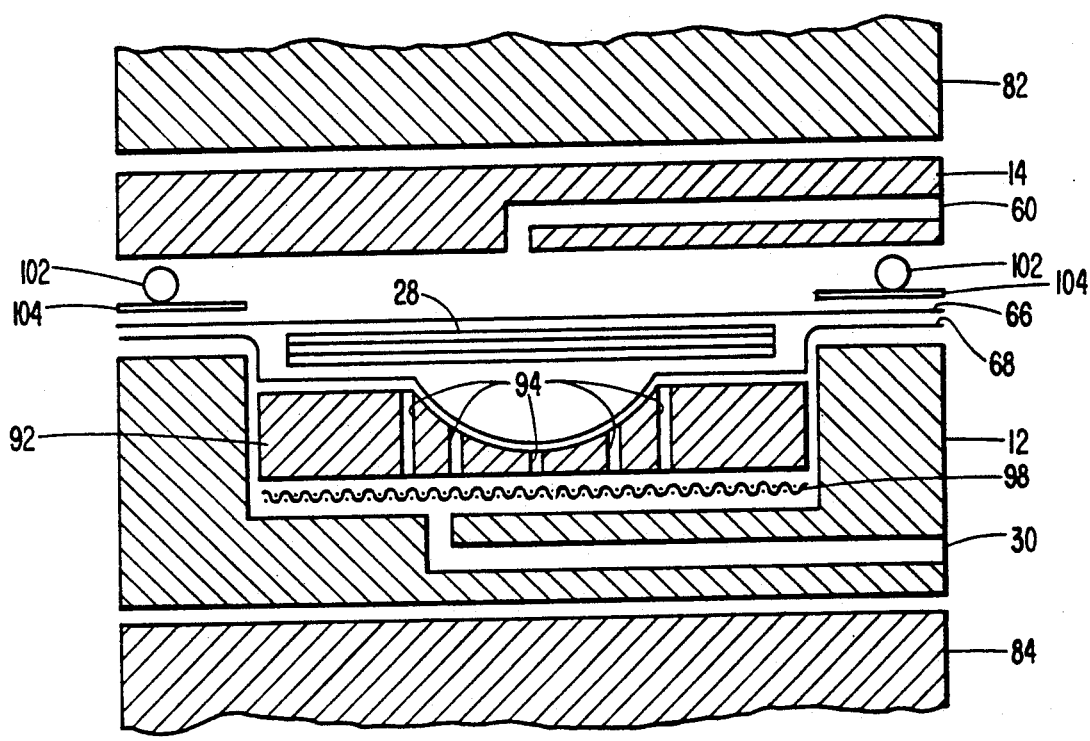
FIG. 2 is a sectional view, partially exploded, of an alternate embodiment of the invention as applied to a consolidation process including forming and shaping the part to a tool shape.

FIG. 2 shows a second embodiment of the present invention. In this second embodiment, all of the parts are the same as in the first embodiment except that the riser blocks 36 and lower support plate or tool 40 are removed and replaced with a curved lower support plate or tool 92. The tool 92 is formed with a plurality of vacuum ports 94 extending therethrough from adjacent the stacked workpiece layers 24 and 26 to the lower pressure inlet port 30. A stainless steel wire screen 98 is also placed immediately beneath the tool. In this embodiment, the lower sheet 68 of polyimide film may be eliminated. It should be appreciated, however, that in either embodiment the lower sheet of polyimide film is optional. Its function is merely to create a smoother surface on the adjacent surface of the workpiece since the mold cavity of the tool is normally more irregular in surface characteristics than the layer of polyimide film. In this second embodiment, as in the first, the consolidation and co-consolidation of the workpiece layers 24 and 26 will occur and be shaped or formed in the same configuration as the adjacent contacted surface, the upper surface of the tool, i.e., flat in the first embodiment and curved in the second embodiment. Times, temperatures, pressures are the same for both embodiments.

In both embodiments, the layers 24 and 26 of the workpiece are consolidated and co-consolidated by the action of heat and pressure and are thus shaped and formed into the final consolidated product as determined by the upper surface of the tool through the application of heat and the pressure differential created on opposite sides of the plies. No adhesive is required between the plies during the co-consolidation.

Sealing of the upper and lower assemblies 12 and 14 are shown in the second embodiment as effected through a soft aluminum seal ring 102 and a polyimide picture frame film 104 located peripherally in the zone where the assemblies contact each other. The soft aluminum seal ring 102 is in contact with the upper assembly 14 while the polyimide picture frame film 104 is between the aluminum seal ring 102 and one or more layers of polyimide sheets 66 and 68 above the lower assembly. Either sealing arrangements could be used in either embodiment.

The method of shaping, forming, consolidating and co-consolidating a workpiece of thermoplastic or thermosetting composite material includes the steps of providing upper 14 and lower 12 supports and also providing upper 66 and lower 68 diaphragms of polyimide sheets of Kapton, Upilex or equivalent film positioned between the upper 14 and lower 12 supports, respectively, in facing relationship and adapted to receive therebetween the workpiece 28 to be shaped, formed, consolidated and co-consolidated. The method further includes the steps of supporting the diaphragms and workpiece on a tool and applying heat in excess of 800 degrees Fahrenheit to opposite sides of the supports, the sheets 66 and 68 and the workpiece 28 and also applying high pressure to one sheet 66 and one side of the workpiece while applying low pressure to the other sheet 68 and the other side of the workpiece for shaping and forming the workpiece into the final composite product.

The following is an example procedure using the diaphragm consolidation/forming process for PEEK thermoplastic, pre-ply laminates in accordance with the present invention.

1) Place the assembled consolidation tool on the press. The press may be preheated to 750°±10° F. as required. Clamp the tool to press bed using 15±5 psi.

2) Vent vacuum line to atmosphere.

3) Heat the laminate to 680±20° F. at 2° to 15° F. per minute and apply 5 to 20 psi pressure to the tool cavity over the layup. Increase clamping pressure as needed to prevent air leaks.

4) Raise laminate temperature to 730±20° F. at 2° to 15° F. per minute. Continue to increase tool cavity pressure to 95±5 psi during heat-up at a maximum rate of 20 psi per minute while increasing the clamping pressure as needed to prevent air leaks.

5) If polyimide film is being formed by itself, raise the tool temperature to 650° to 670° F. at 1° to 20° F. per minute. At 560° F., gradually increase tool cavity pressure to 95±5 psi. Increase clamping pressure as needed to prevent air leaks.

6) When full pressure is reached, apply full vacuum at the rate of 5 to 10 inches of Hg per minute.

7) Hold at temperature and pressure for a minimum of 5 minutes.

8) Cool laminate to 350° F. or lower at a minimum rate of 5° F. per minute. Release pressure and vacuum slowly from the tool cavity and remove tool from press.

The following additional comments generally characterize the invention, in combination use of polyimide film as upper pressure barrier or bag for forming a formable high temperature plastic workpiece on a mold wherein the high temperature plastic lies with the mold and the film is sealed around the mold edge in spaced relation to the plastic workpiece heating the plastic to be shaped, formed, and consolidated to a high temperature whereat the polyimide film possesses significant stretch capacity applying vacuum on the low side and pressure on the high side of the film so that the plastic forms and consolidates to the shape of the mold under the force of the polyimide film as the latter stretches down and into intimate contact with the plastic workpiece.

If the plastic workpiece is thermoplastic, the heat applied is sufficient to raise its temperature and that of the film above the glass transition temperature of the plastic.

If the workpiece is a high temperature thermoset it is heated to at least its forming temperature at the time of forming and to the curing temperature while so formed. For thermoset, a trap would be put in the vacuum line to remove reaction products of the thermoset process.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts and method steps may be resorted to without departing from the spirit and scope of the invention.

What is claimed is:

1. Apparatus for shaping, forming, consolidating, and co-consolidating a workpiece into a composite product, said workpiece formed of layers of thermoplastic or thermosetting material and having upper and lower sides, said apparatus including:

an upper support and a lower support supported in opposed relationship for relative movement toward and away from each other, said lower support having a recess therein, a tool-shaped, apertured plate positioned in said recess in said lower support, said apertured plate serving to shape and support said workpiece as it is formed, an upper sheet and lower sheet of polyimide film located between said upper and lower supports and in facing relationship and adapted to receive the workpiece therebetween, said upper sheet being in pneumatically sealed relationship with said upper support to serve as a diaphragm on the upper side of said workpiece, said lower sheet being in pneumatic communication with said lower support and perforated for pneumatic communication with the lower side of said workpiece, means for applying heat in excess of 800 degrees Fahrenheit to said supports, upper and lower polyimide sheets, support plate, and said workpiece, means for applying air under high pressure between the upper sheet and the upper support to operatively press and deform the upper sheet against the workpiece for applying a shaping force thereto, and means for simultaneously applying vacuum through said apertured plate to the lower sheet and the lower side of said workpiece, said air under pressure operating against the upper sheet presses and shapes the workpiece toward the lower support to which it is pulled by said vacuum to shape said heated workpiece into a formed composite product by stretching the polyimide film under heat and pressure into plastic deformation against the workpiece and toward the plate from the upper side and by pulling the workpiece into intimate contact with the plate under vacuum from said lower side, said vacuum being applied to and through apertured plate and said lower polyimide sheet to said workpiece.

2. A method for shaping, forming, consolidating, and co-consolidating a workpiece into a composite product, said workpiece formed of layers of thermoplastic or thermosetting material and having upper and lower sides, comprising the steps of:

providing an upper support and a lower support mounted in opposed relationship for relative movement toward and away from each other, said lower support having a recess therein; a tool-shaped, apertured plate positioned in said recess in said lower support; said apertured plate serving to shape and support said workpiece as it is formed; and an upper sheet of polyimide film and a lower sheet of perforated polyimide film;

locating said sheets between said upper and lower supports and in facing relationship and adapted to receive said workpiece therebetween, placing said workpiece between said sheets, pneumatically sealing said upper sheet to said upper support to serve as a diaphragm on the upper side of said workpiece, placing said lower sheet in pneumatic communication with said lower support and, through said perforations with the lower side of said workpiece, applying heat in excess of 800 degrees Fahrenheit to said supports, said upper and lower polyimide sheets, said support plate, and said workpiece, applying air under high pressure between the upper sheet and the upper support to operatively press and deform the upper sheet against the workpiece by applying a shaping force thereto, and simultaneously applying vacuum through said apertured plate to the lower sheet and the lower side of said workpiece, until said air under pressure operating against the upper sheet presses and shapes the workpiece toward the lower support to which it is pulled by said vacuum to shape said heated workpiece into a formed composite product by stretching the polyimide film under heat and pressure into plastic deformation against the workpiece and toward the plate from the upper side and by pulling the workpiece into intimate contact with the plate under vacuum from said lower side, said vacuum being applied to and through said apertured plate and said lower polyimide sheet to said workpiece.

* * * * *